(No Model.) 3 Sheets—Sheet 1.

N. P. PERKINS.
TOBACCO CUTTING MACHINE.

No. 579,305. Patented Mar. 23, 1897.

(No Model.) 3 Sheets—Sheet 2.

N. P. PERKINS.
TOBACCO CUTTING MACHINE.

No. 579,305. Patented Mar. 23, 1897.

Witnesses:

Inventor
Nicholas P. Perkins
By H. Bierussy
Attorney.

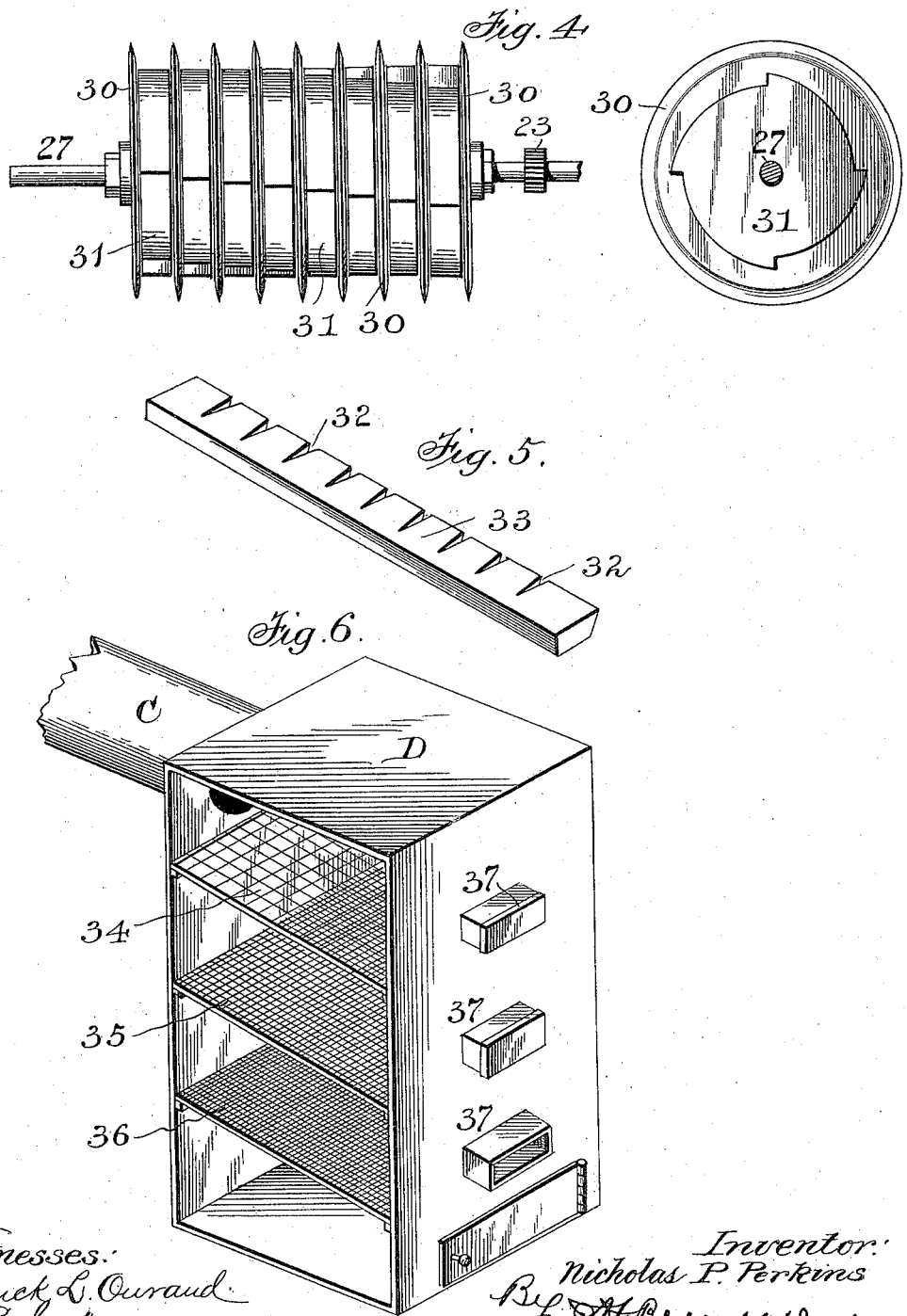

UNITED STATES PATENT OFFICE.

NICHOLAS P. PERKINS, OF ROANOKE, VIRGINIA, ASSIGNOR OF THREE-FOURTHS TO JAMES O. B. PALMER, JOEL A. JAMISON, AND THOMAS E. JAMISON, OF SAME PLACE.

TOBACCO-CUTTING MACHINE.

SPECIFICATION forming part of Letters Patent No. 579,305, dated March 23, 1897.

Application filed December 6, 1895. Serial No. 571,268. (No model.)

*To all whom it may concern:*

Be it known that I, NICHOLAS P. PERKINS, a citizen of the United States, residing at Roanoke, in the county of Roanoke and State of Virginia, have invented certain new and useful Improvements in Tobacco-Cutting Machines; and I do declare the following to be a full, clear, and exact description of the invention, such as will enable others skilled in the art to which it appertains to make and use the same.

My invention has relation to improvements in tobacco-cutting machines employing rotating knives; and the object is to provide an improved machine of enlarged capacity, efficient in operation, and simple and durable in construction.

The invention is fully and clearly illustrated in the accompanying drawings, forming a part of this specification, and, reference being thereto had—

Figure 1:
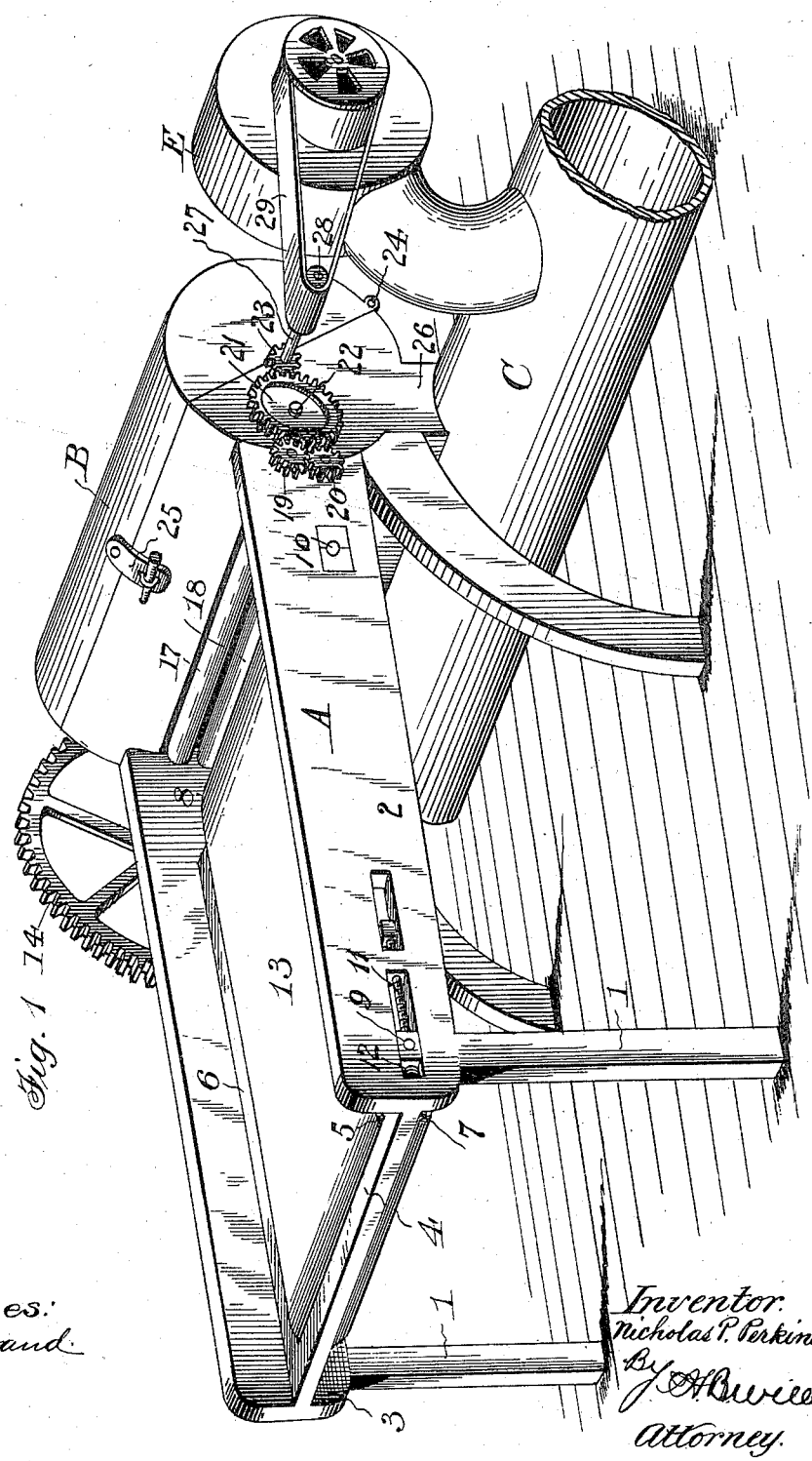
Figure 2:
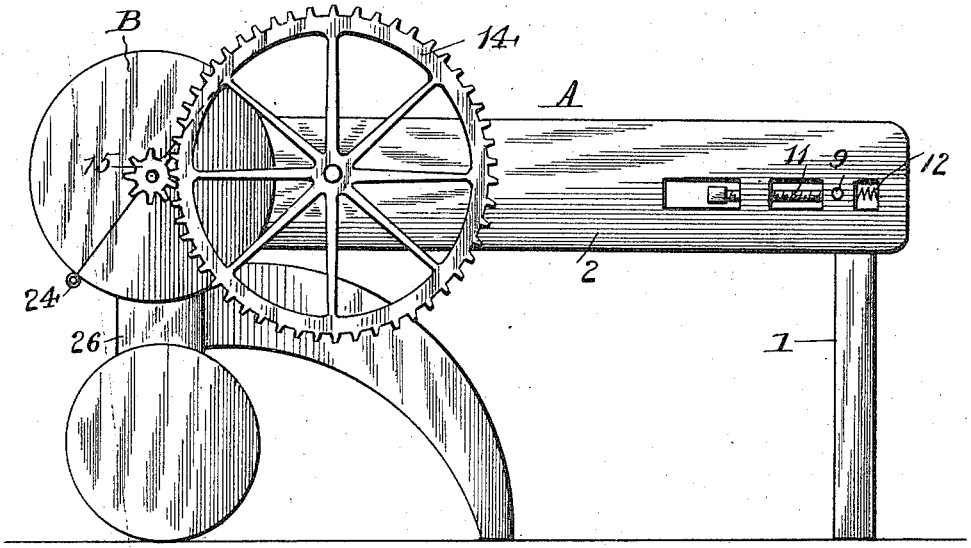
Figure 3:
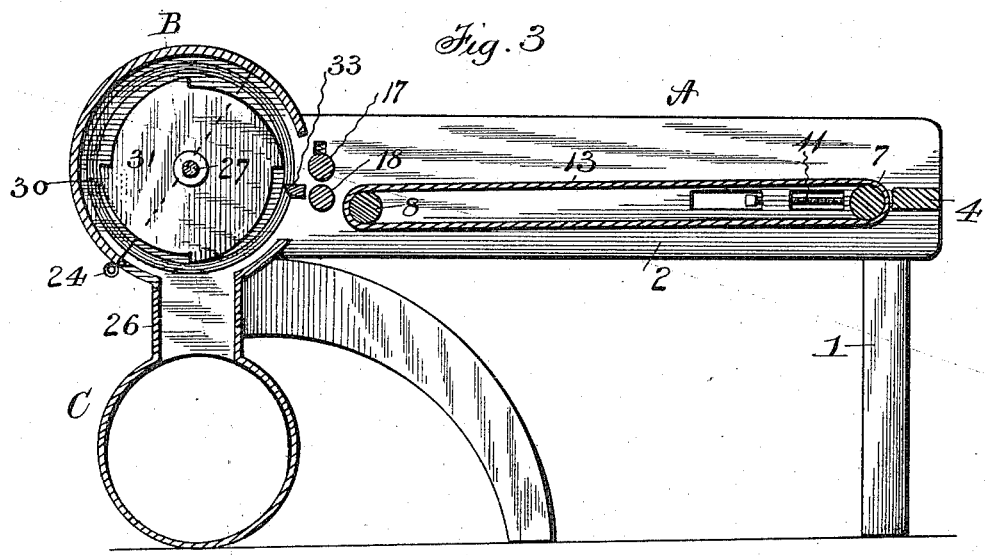

Figure 1 is a perspective view of the machine. Fig. 2 is a side view taken from the side opposite to that seen in Fig. 1. Fig. 3 is a section taken on the dotted line of Fig. 1. Fig. 4 is a detail view of the rotary knives and saws removed from the machine. Fig. 5 is a detail of the knife-plate, showing the slits into which the rotating knives project. Fig. 6 is a perspective of the receiving and assorting chamber, one side thereof being removed to show the assorting or dividing and distributing chamber.

A designates the frame of the machine, supported on substantial legs 1. The supporting portion of the frame or table comprises two substantial side pieces 2 3, connected by a strong cross-piece 4 at the front ends and having flanges 5 6 formed on their inner faces and extending inward for the length thereof, substantially as shown in Fig. 1 of the drawings, these flanges and end pieces constituting a frame within which is located and arranged the feed-apron, as hereinafter described. Across the frame, at each end of the opening therein, is mounted a roller 7 8, journaled in suitable bearings 9 10, arranged in the side pieces of the frame. The bearings 9 are made adjustable by means of adjusting-screws 11, let through the wall of the bearing-seat to bear against the bearing-boxes 9, which are held in any adjusted position by means of the spring-cushion 12, as shown in Figs. 1 and 2 of the drawings, the purpose being to provide convenient means for regulating the tension of the traveling apron 13 to the duty imposed upon it of sustaining the block or cake of prepared tobacco fed to the knives. The journal of the roller 8 is extended a suitable distance and has fixed thereon a large gear-wheel 14, which meshes with a small gear-wheel 15, mounted on the shaft carrying the knives and saws, substantially as shown in Fig. 2 of the drawings. On the rollers 7 and 8 is arranged an endless apron or belt 13, consisting of any proper material and which apron constitutes the traveling table whereby the tobacco is carried to the feed-rollers.

At the rear end of the table, adjacent to that end of the traveling table, are journaled two feed-rollers 17 18, the upper one of which is journaled in bearings having a limited yielding function to adapt the bite of the rollers to varying quantities of tobacco or to overcome any impediment occasioned by a hard or unbroken piece of the cake or block. On the journal of the feed-roller 17 is fixed a small gear-wheel 19, which meshes with a similar gear-wheel 20 on the journal of the roller 18. The small gear-wheel 19 also meshes with and receives rotation from a larger idler gear-wheel 21, journaled on a stud-journal 22, projected from the side of the casing or frame. The idler gear-wheel 21 is also rotated by engagement with a small gear-wheel 23, fixed on the knife-shaft, substantially as shown in Fig. 1 of the drawings.

On the end of the frame is formed or secured by any suitable means the knife and saw casing B, consisting of a cylinder made in two parts hinged together, as at 24, and provided with fastening means, as 25, to hold the hinged part down in closed relation to the other part. The under part of the casing B is formed or provided with a spout or chute 26, extending the length of the cylinder and opening therefrom into an exhaust conduit-pipe C, arranged under the knife-box, as shown, and leading to the assorting-chamber hereinafter described.

In the casing B is journaled a shaft 27, carrying a belt-pulley 28 and also the small gear-wheel 23 and the small gear-wheel 15, the latter two elements having been heretofore specified and their functions set forth. The band-pulley 28 carries a belt 29, which is carried to and arranged on the power-pulley. On the shaft 27 are secured a series of circular knives 30 and also a series of circular saws 31, the knives and saws being disposed in alternation on the shaft, as shown in the drawings. The knives take in slits 32 in a plate 33, arranged and secured across the table adjacent to the knives substantially as shown, the purpose being to permit the knives to cut into the tobacco in advance of the saws, so as to present the tobacco to the action of the saws cut into vertical sections. The plate 33 being divided into sectional parts by the slits 32, which extend partially across the plate, and being sharply angular at the upper inner corner or edge, they present a cutting edge to the tobacco when the saws strike the tobacco and cut or break off the lower layer or layers of the tobacco from the cake.

The saws 31, it will be perceived, are of less diameter than the circular knives 30, but of such size as to bring the cutting-line of the saw-teeth adjacent to the cutting edge of the knives, and are disposed or arranged on the shaft with their teeth in spiral or diagonal relation, so that their contact with the tobacco will be in the nature of a shearing stroke by the series, any line of the series of teeth striking in succession the tobacco presented for their action.

The relative distance between the knives and saws is according to the size of chip to which the tobacco is to be cut, being closer or farther apart, as fine or coarse chips are to be made or produced.

To the outer end of the exhaust pipe or conduit C is connected the assorting or distributing chamber D, consisting of a rectangular casing divided into compartments by sieves 34 35 36, arranged at an incline across the chamber and graduated in the size of mesh from coarse to fine, the upper sieve 34 being of such size of mesh as to permit a rather free passage of material and to retain only such portions of the tobacco as may require re-forming into cakes and blocks and again be subjected to the machine, and the sieve 35 being of such mesh as to retain tobacco of a coarse cut, the finer grades passing through and lodging on the sieve 36, which retains the finest grade of chips and permits the dust and powdered tobacco to fall through into the bottom part of the chamber. Each compartment of the chamber is provided with an opening 37, provided with a detachable cap or cover, substantially as shown.

To create and produce the exhaust from the machine sufficient to carry the material away from the knives and force it into the distributing-chamber, I use a fan E, having a blow-pipe leading into the exhaust-pipe at a point in the suction-pipe intermediate between the cutters and the distributing-chamber, which interposition creates the suction and also forces the material into the distributing-chamber, and at the same time produces sufficient agitation in the chamber to carry the material from the top sieve to the lowest one.

The operation of the machine is as follows: The tobacco being formed into cakes or blocks, as usual, is laid on the traveling apron and by that moved into the bite of the feed-rollers, which carry it into contact with the circular knives, which cut it into small vertical sections, and these being pushed ahead are brought into contact with the saws, the teeth striking them downward and cutting and breaking the tobacco into small angular pieces, which, dropping down through the chute or pipe leading into the conduit-pipe, are there subjected to the exhaust and thereby carried through the conduit and forced into the distributing-chamber, there to be assorted by the arrangement of the graduated tier or series of sieves.

Having thus described my invention, what I claim, and desire to secure by Letters Patent, is—

1. In a tobacco-cutting machine, the combination with a suitable support and an inclosing cylinder, of a cutting means, comprising a rotating shaft, a series of circular knives secured on the shaft, a series of circular saws on the shaft, between the knives, of less diameter than the knives with their cutting-line adjacent to the cutting edge of the knives, and a slitted plate having an angular cutting edge contiguous to the saws, and arranged abreast the knives with the cutting edges thereof in the slits, substantially as set forth.

2. In a tobacco-cutting machine, a cutting mechanism, comprising a shaft, a multiple of circular knives on the shaft, a multiple of circular saws intermediate of the knives and of slightly less diameter than the knives, a plate provided with slits to take and fit between the knives and having a sharp cutting edge arranged contiguous to the saws, and means to feed a cake or block of tobacco to the knives and saws.

3. In a tobacco-cutting machine, a cutting mechanism, comprising a shaft, a plurality of circular knives arranged thereon, a plurality of circular saws on the shaft intermediate of the knives and of slightly less diameter than the knives and arranged with the teeth of the series to form a spirally-directed line, a slitted plate to take in the knives and arranged abreast of the saws and formed with a sharp cutting edge, and means to rotate the knives and saws and feed the tobacco thereto.

In testimony whereof I hereunto affix my signature in presence of two witnesses.

NICHOLAS P. PERKINS.

Witnesses:
A. B. SUIT,
R. HERZOG.